United States Patent
Desseignes et al.

[11] Patent Number: 6,122,262
[45] Date of Patent: Sep. 19, 2000

[54] PROTOCOL FOR SELF-ADAPTIVE INTERCOMMUNICATION BETWEEN FIXED RADIO STATIONS OF A CELLULAR TELEPHONY NETWORK

[75] Inventors: Christophe Desseignes, Bry-sur-Marne; Olivier Blondeau, Rambouillet; François Despres, Bievres, all of France

[73] Assignee: France Telecom, Paris, France

[21] Appl. No.: 08/932,582

[22] Filed: Sep. 17, 1997

[30] Foreign Application Priority Data

Sep. 18, 1996 [FR] France ................................ 96 11371

[51] Int. Cl.[7] .............................. H04Q 7/00; H04Q 7/20
[52] U.S. Cl. ...................... 370/328; 370/331; 370/397; 455/436
[58] Field of Search ..................... 370/328, 329, 370/331, 349, 395, 396, 397, 409, 403, 404, 465, 466, 467; 455/436, 450

[56] References Cited

U.S. PATENT DOCUMENTS

| | | | |
|---|---|---|---|
| 4,989,204 | 1/1991 | Shimizu et al. | 370/328 |
| 5,293,642 | 3/1994 | Lo | 455/456 |
| 5,371,738 | 12/1994 | Moelard et al. | 370/331 |
| 5,408,514 | 4/1995 | Sakamoto et al. | 455/436 |
| 5,408,610 | 4/1995 | Arakawa | 709/245 |
| 5,423,067 | 6/1995 | Manabe | 455/524 |
| 5,434,854 | 7/1995 | Focarile et al. | 370/335 |
| 5,724,346 | 3/1998 | Koybayashi et al. | 370/329 |
| 5,901,364 | 5/1999 | Zetterblad | 455/550 |
| 5,903,840 | 5/1999 | Bertacchi | 455/436 |
| 5,907,542 | 5/1999 | Kuehnel et al. | 370/331 |

FOREIGN PATENT DOCUMENTS

| | | |
|---|---|---|
| 2282299 | 3/1995 | United Kingdom . |
| 2290195 | 12/1995 | United Kingdom . |
| WO95/35612 | 12/1995 | WIPO . |

*Primary Examiner*—Hassan Kizou
*Assistant Examiner*—Saba Tsegaye
*Attorney, Agent, or Firm*—Larson & Taylor, PLC

[57] ABSTRACT

A protocol for interconnection between fixed radio stations of a cellular telephony network for the transmission of management messages to manage the cellular radiotelephony network in asynchronous mode transmission or DQDB, in which geographical coordinates are assigned to each fixed radio station of the network, and a virtual-ring interconnection for any set of two neighboring stations is formed. The management messages between neighboring stations, identified on the basis of their geographical coordinates, on the virtual ring, using a self-adaptive intercommunication process are transmitted.

9 Claims, 7 Drawing Sheets

$M_{12}$ $M_{21}$

PROTOCOL FOR SELF-ADAPTIVE INTERCOMMUNICATION BETWEEN FIXED RADIO STATIONS OF A CELLULAR TELEPHONY NETWORK

The present invention relates to a protocol for self-adaptive intercommunication between fixed radio stations of a cellular telephony network. The purpose of this protocol is to allow the transmission of messages for managing this network between the various fixed radio stations which constitute it.

Telecommunication networks are currently playing an increasing role in the economic life of industrialized countries, these networks allowing information to be exchanged in real-time between the players in the economies of these countries.

This is, in particular, the case as regards mobile radiotelephony networks, which are being made to carry an increasingly large volume of information.

In the aforementioned networks, this information, a speech signal for radiotelephony networks, is most often transmitted in digital form in the asynchronous mode referred to as ATM (Asynchronous Transmission Mode), the speech signal being sampled and digitized, then subdivided into cells corresponding to speech signal frames corresponding to one or more successive time intervals.

Each cell essentially comprises a destination address field and a data field, these data representing a part of the information to be transmitted. Each cell is routed on the base of the destination address by switching at each node of the network, this address being re-updated for later switching each time switching takes place.

In the more specific case of networks such as cellular radiotelephony networks, these networks may consist of a plurality of fixed radio stations which, as represented in FIG. 1a, are linked and interconnected in clusters or trees via concentrators or connection units, which are interconnected to switching centres. This is, in particular, the case of GSM and POINTEL networks. Other techniques for interconnecting the stations may be used, for example, as represented in FIG. 1b, at least at each concentrator, the interconnection of the fixed radio stations in a physical ring. A physical ring consists of a physical connection and transmission medium such as a transmission cable allowing a concentrator and a given plurality of fixed radio stations to be interconnected in a closed circuit. Using a physical ring has a major advantage because, even if the transmission cable is interrupted accidentally, the fixed radio stations remaining interconnected before and after the interruption can be reached by the concentrator, simply by managing the direction of transmission of the cells to one end of the interruption then the other.

In all cases, irrespective of the type of interconnection which is used, efficient use of these networks by a mobile telephone set requires efficient management of the neighbouring fixed radio stations of any fixed radio station in this network, especially when this mobile telephone set is moving around in this network. Rational management of the neighbouring stations of a cellular telephony network is a determining factor for the "physical" and economic efficiency of this network and entails updates which are particularly demanding and expensive for the operator of this network. This is, in particular, the case for the aforementioned GSM and POINTEL networks, firstly when additional fixed radio stations are installed in an existing network. It is also the case, secondly, on an existing network in order to ensure automatic intercellular transfer, or hand-over, when a mobile telephone set moves from the coverage zone of a first fixed radio station to that of a second fixed radio station, i.e. from a given cell in the network to a cell adjacent to this cell. Hand-over is carried out by transferring the context relating to the communication from the old fixed radio station to the new one. Specifically, in the aforementioned cases, the management of the neighbouring stations in the network is conventionally carried out by configuring lists of neighbouring stations, it being the responsibility of the network operator to update these lists.

The object of the present invention is to overcome the aforementioned drawbacks by implementing a protocol for self-adaptive intercommunication between fixed radio stations of a cellular telephony network which, in particular, allows simplified management of the neighbouring stations irrespective of the type of interconnection of the fixed radio stations in the network.

A further object of the present invention is to implement the aforementioned protocol with the aim of simplifying the hand-over management.

Another object of the present invention is furthermore to implement the aforementioned protocol with the aim of improving the reception of incoming calls on the cellular telephony network, these incoming calls, aiming to establish communication with a mobile set, originating from a telephone subscriber set interconnected to the switched telephone network.

Another object of the present invention is, lastly, to implement the aforementioned protocol in order to facilitate the installation of distributed algorithms for dynamic channel allocation, allowing the fixed radio stations of a given zone, that is to say the neighbouring stations of any fixed radio station in this network, to carry out dynamic distribution of the radio resources automatically.

The protocol for intercommunication between fixed radio stations of a cellular telephony network between the fixed radio stations in this network, forming the subject of the present invention, is noteworthy in that it consists at least in assigning geographical coordinates to each fixed radio station belonging to this network and in forming a virtual-ring interconnection for any set of two successive fixed radio stations constituting neighbouring stations. The management messages are then transmitted between neighbouring stations, the neighbouring stations being identified on the basis of the geographical coordinates on the virtual ring, which makes it possible to transmit the management messages by self-adaptive intercommunication between all the fixed radio stations of the network.

The protocol forming the subject of the present invention can be applied to any type of mobile radiotelephony network for which the access networks to the fixed radio stations, the physical medium for transmission of the management messages, manage the connections of virtual rings, in particular a link such as asynchronous ATM or DQDB (Distributed Queue Dual Bus).

On this type of access network, it has a particular application to hand-over management, improving the reception of incoming calls and installing distributed algorithms for dynamic channel allocation, allowing the fixed radio stations of a given zone to perform dynamic auto-distribution of the radio resources.

It will be understood more clearly on reading the description and on studying the drawings in which, in addition to FIGS. 1a and 1b which relate to two types of physical interconnection of the networks, which are known from the prior art, FIG. 2a represents, in the form of a functional diagram, a flow chart of the steps needed for implementing the intercommunication protocol forming the subject of the present invention;

Figure 3A:
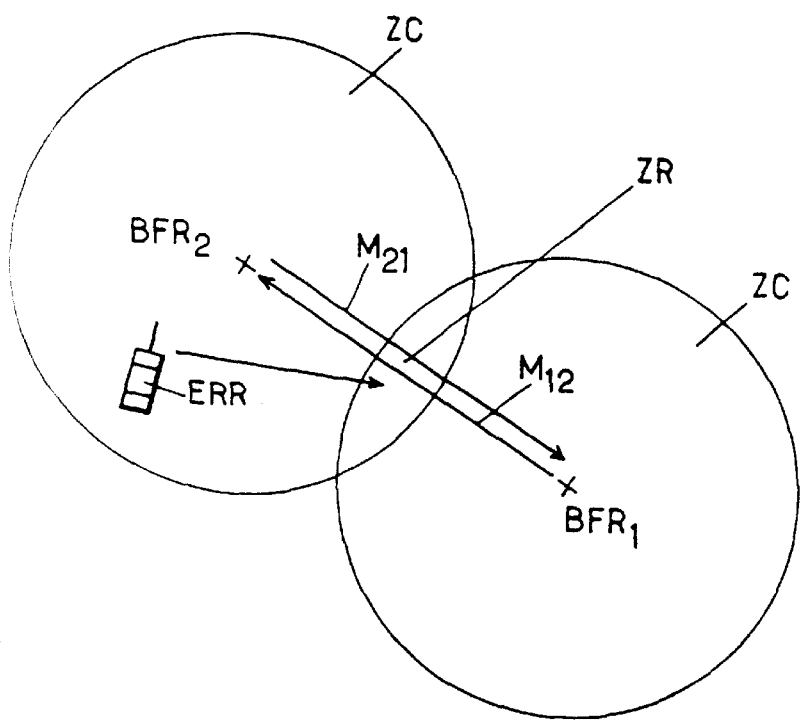
Figure 3A:
Figure 3A:
Figure 3B:
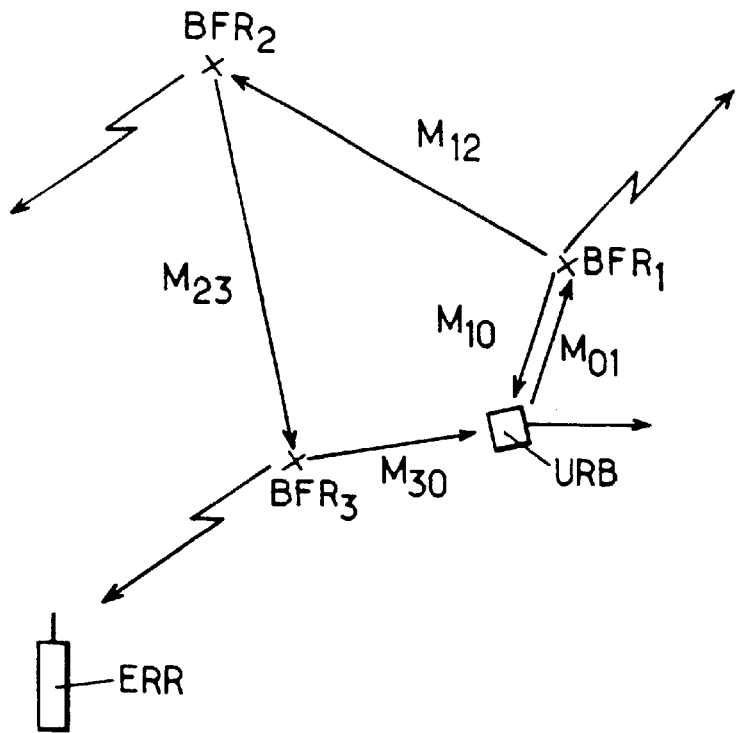
Figure 3C:
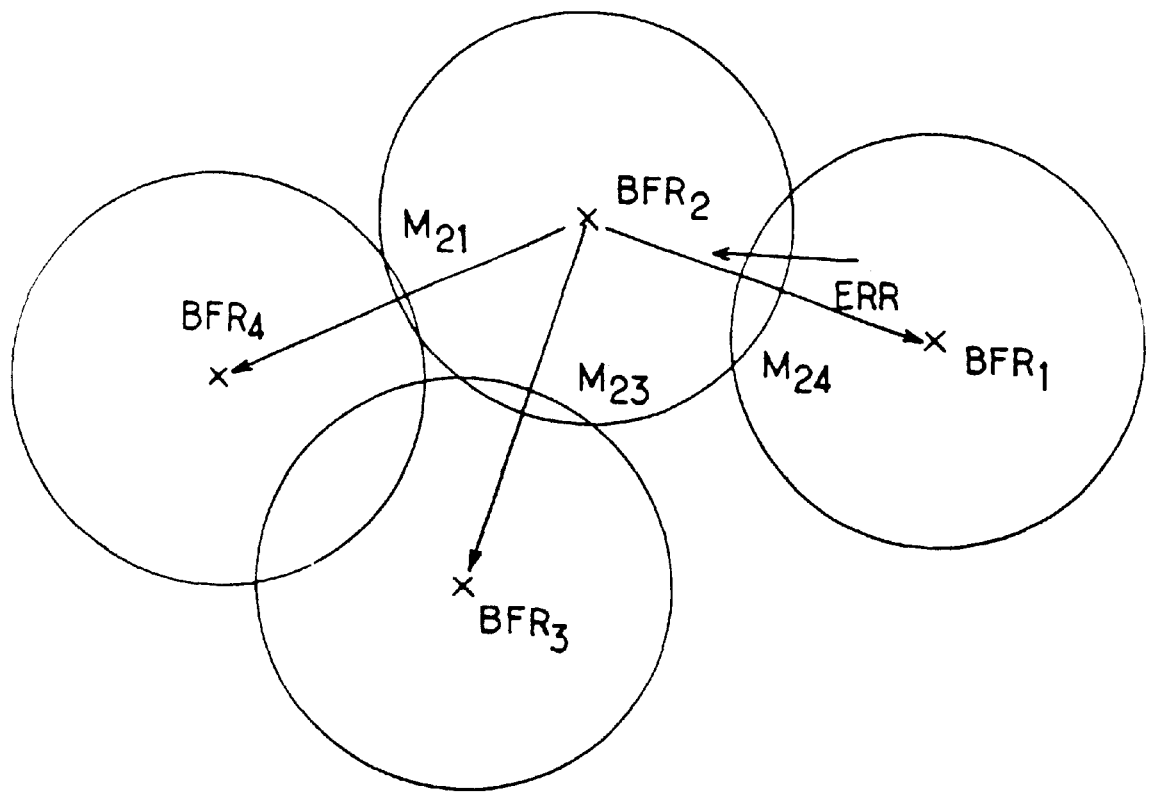

FIGS. 3a, 3b and 3c represent the structure of the management messages exchanged according to the intercommunication protocol forming the subject of the present invention, in the context of applications to simplifying the hand-over management, improving the incoming calls on the cellular telephony network and installing distributed algorithms for dynamic channel allocation in order to carry out automatic dynamic distribution of the radio resources.

A more detailed description will now be given below of the protocol for intercommunication between fixed radio stations of a cellular telephony network, according to the subject of the present invention and allowing the transmission of network management messages between these stations.

Figure 1A:
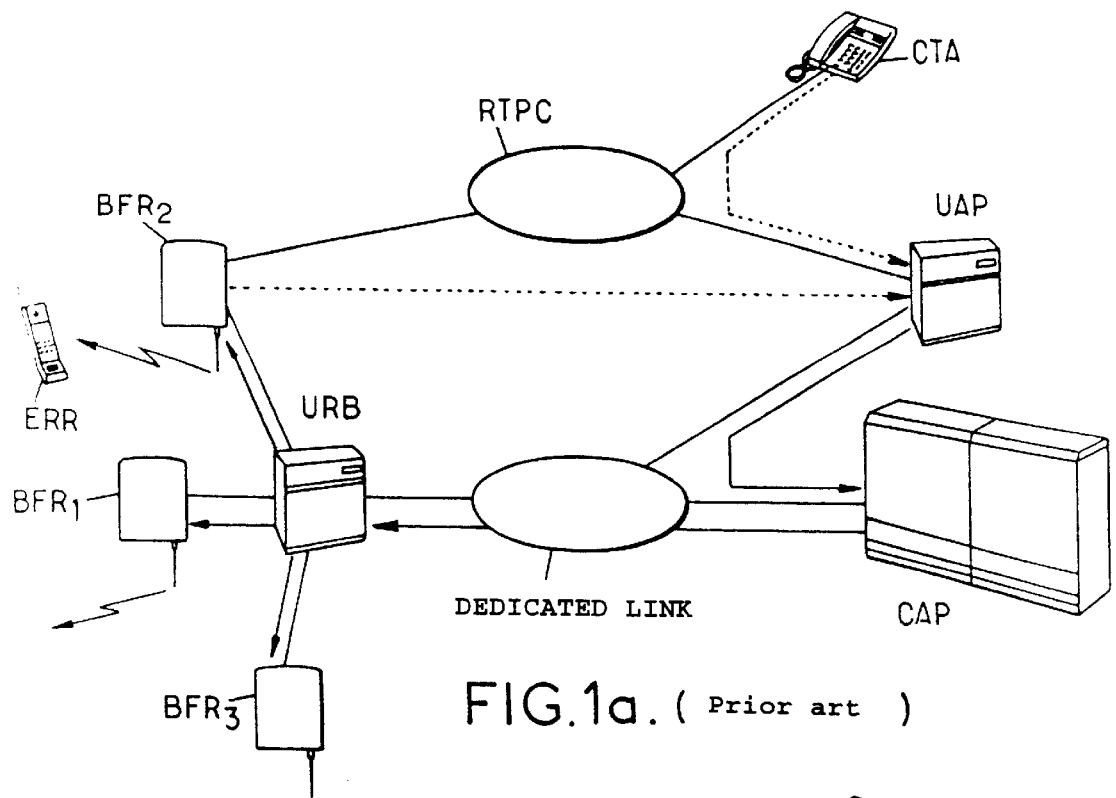
Figure 1B:
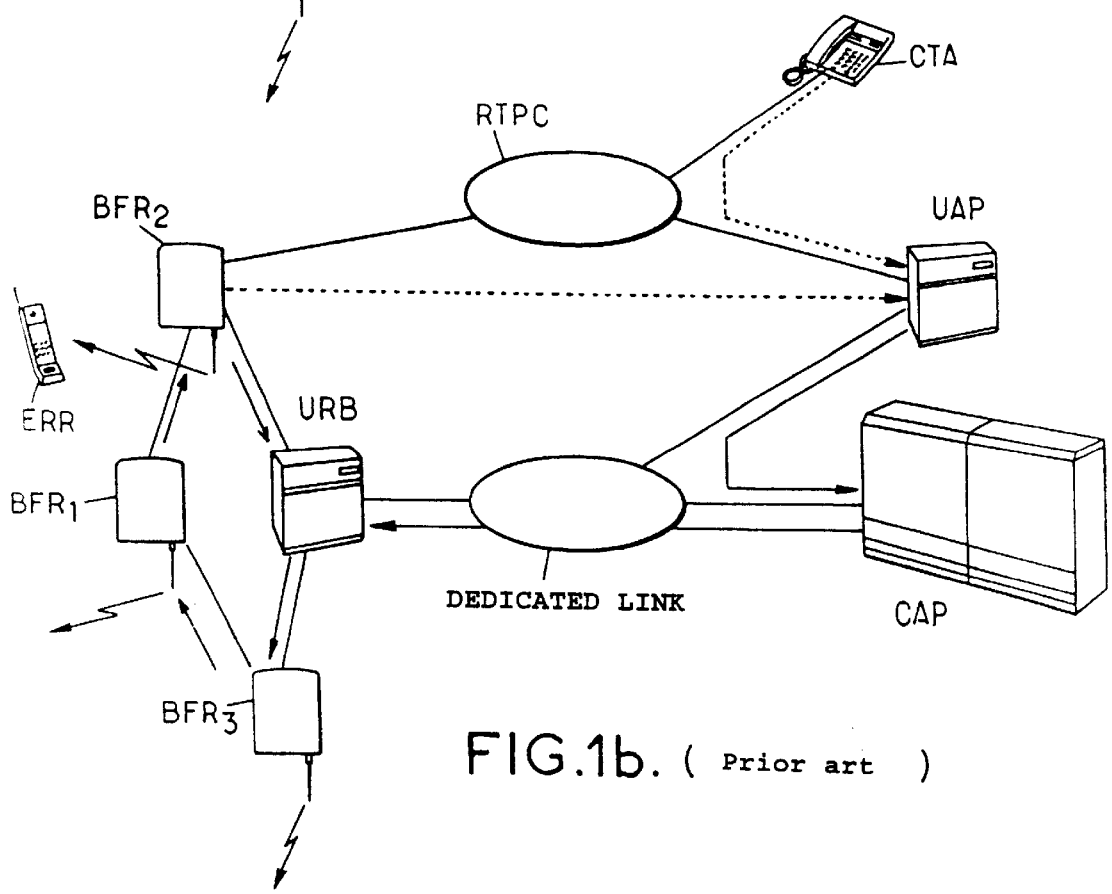

A description of the physical interconnection mode of the fixed radio stations for transmitting these management messages will firstly be given in conjunction with FIGS. 1a and 1b.

FIG. 1a represents the general structure of a network such as, for example, a POINTEL cellular telephony network which consists of at least one mobile radio transmitter/receiver, denoted ERR, per mobile set in radio link with a plurality of fixed radio stations, denoted $BFR_1$ to $BFR_3$.

In the physical interconnection mode represented in FIG. 1a, the fixed radio stations are interconnected in a tree structure by station connection units, denoted URB, also referred to as concentrators, to a mobile subscriber authentication centre denoted CAP.

The URB is interconnected to the mobile subscriber authentication centre by a dedicated link. All of these together form the cellular telephony network proper.

In general, the interconnection between the telephone set of a subscriber to the public switched network RTPC is ensured by an access unit UAP for access to the mobile telephony network. The subscriber telephone set of the subscriber to the public switched telephone network is denoted CTA.

In this type of cellular telephony network, a procedure or protocol for routing incoming calls, for example from the public switched telephone network originating from the telephone set CTA, implements specific operations which are made necessary because of the actual configuration of the cellular telephony network. This procedure is known from the prior art and employs various steps which make it possible to join the incoming call originating from the CTA with the radio transmitter/receiver ERR after a procedure of successive interrogation of the fixed ratio stations managed by a given URB.

A second physical connection mode for the fixed radio stations $BFR_1$ to $BFR_3$ may also be envisaged, as represented in FIG. 1b where the same references denote the same elements as in FIG. 1a.

In the case represented in FIG. 1b, the station connection unit URB and the fixed radio stations $BFR_1$ to $BFR_3$ are then physically interconnected by a ring line allowing management messages to be transmitted successively from one fixed radio station to the next, on the path of the ring thus formed.

The management of one or other transmission direction of the management messages on the physical interconnection ring also makes it possible, in the same way as in the case in FIG. 1a, to transmit these management messages to all the fixed radio stations managed by a given connection unit URB, even if one of the links between fixed radio stations or between fixed radio stations and connection unit URB is accidentally cut.

The protocol for intercommunication between fixed radio stations of a cellular telephony network for the transmission of messages for managing this network between these stations, according to the subject of the present invention, will now be described in conjunction with FIG. 2a and the following figures.

Figure 2A:
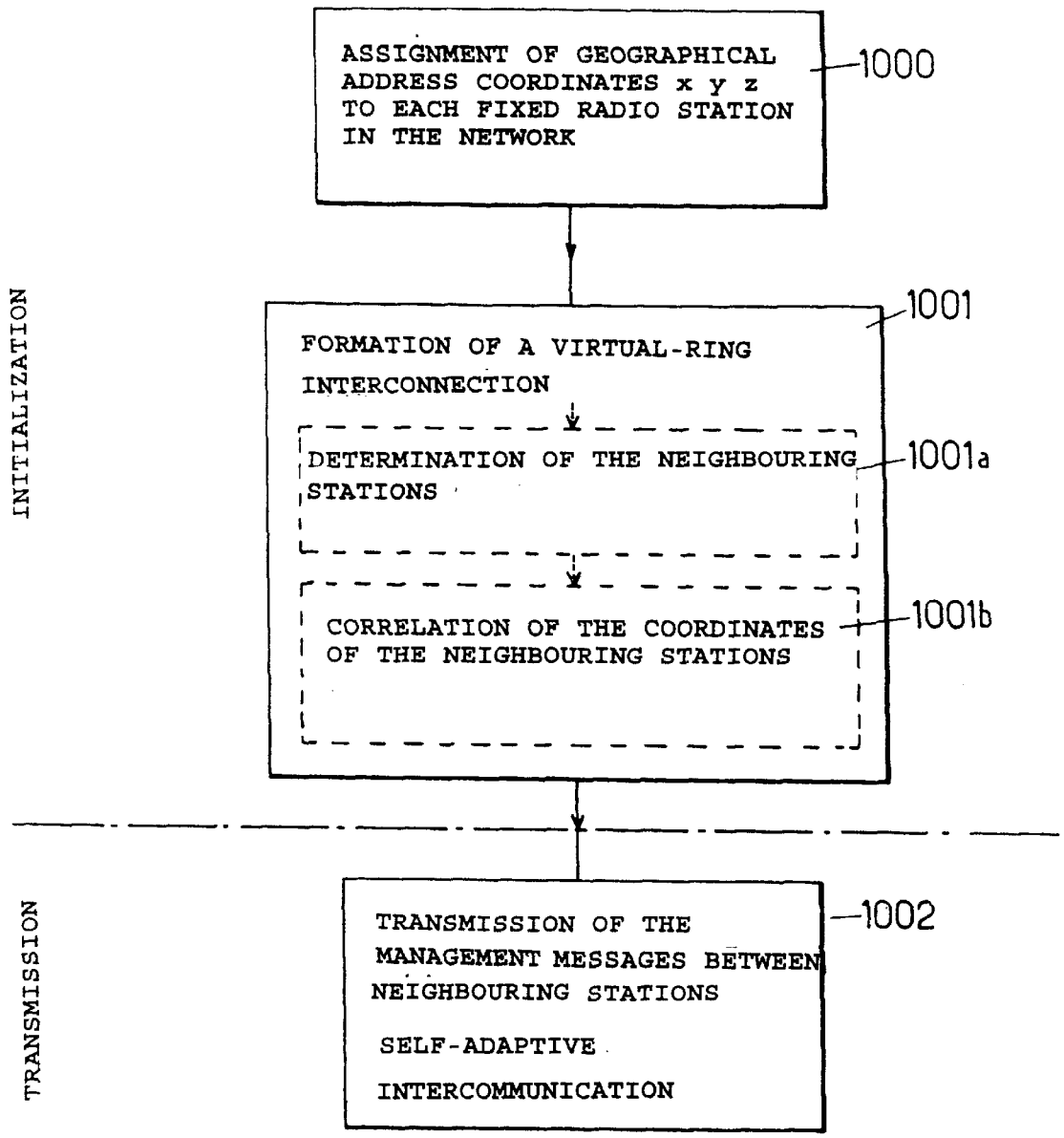
FIG. 2b represents an illustration of an illustrative embodiment of a first step of the intercommunication protocol forming the subject of the present invention.
FIG. 2c represents an illustration of the configuration of a management message when these messages, according to an illustrative embodiment of the intercommunication protocol, are transmitted in asynchronous ATM mode.
FIGS. 2d and 2e represent an illustration of an illustrative embodiment of a second step of the intercommunication protocol forming the subject of the present invention, in the case of a network in which the physical interconnection is carried out according to FIG. 1a and FIG. 1b, respectively.

As represented in FIG. 2a, the interconnection protocol forming the subject of the present invention consists in a step 1000 of assigning geographical coordinates to each fixed radio station of the cellular telephony network. The geographical coordinates may be coordinates in a three-dimensional space, for example, but in most cases this three-dimensional space x, y, z can be reduced to a two-dimensional space x, y without compromising the generality of the protocol forming the subject of the present invention.

It may be pointed out that the assigning of geographical address coordinates can be carried out on the basis of a map reference for example, or, if appropriate, using a satellite positioning system such as the GPS system, for example.

The aforementioned step 1000 is then followed by a step 1001 consisting in forming a virtual-ring interconnection for any set of two successive fixed radio stations constituting neighbouring stations.

In general, it may be pointed out that, according to a particularly advantageous aspect of the protocol forming the subject of the present invention, the interconnection of the neighbouring stations, that is to say of two successive fixed radio stations, in a virtual ring, can be carried out either on a network of fixed radio stations interconnected to the connection unit URB in a tree form, as represented in FIG. 1a, or in the case of a cellular telephony network whose fixed radio stations are interconnected to the connection unit URB by means of a fixed physical ring, as represented in FIG. 1b.

It will furthermore be noted that, both in FIG. 1a and in FIG. 1b, only a single connection unit has been represented so as not to overburden the drawing. It is clear that an actual network includes a plurality of connection units URB and that, if appropriate, the protocol forming the subject of the present invention can be implemented for a network whose various connection units URB are connected to the various fixed radio stations managed by each connection unit using one or other of the physical connections represented in FIG. 1a and/or FIG. 1b.

As represented schematically and symbolically in FIG. 2a, it may be indicated that the step 1001 of forming a virtual-ring interconnection can advantageously consist in a step of determining the neighbouring stations, denoted 1001a, followed by a step 1001b consisting in correlating the coordinates of the neighbouring stations. Steps 1001a and 1001b will be described in further detail later in the description.

As represented in FIG. 2a, steps 1000 and 1001 actually correspond to a network initialization phase. The network initialization phase is then followed by a transmission phase, which consists in a step denoted 1002 subsequent to the aforementioned step 1001.

Step 1002 consists in transmitting the management messages between neighbouring stations by means of the virtual-ring interconnection. Of course, the neighbouring stations are identified on the basis of the geographical coordinates on the virtual ring, identification of this type then making it possible to transmit management messages using self-adaptive intercommunication between all the neighbouring fixed radio stations in the network.

The self-adaptive nature of the intercommunication results in the transmission of the management messages to the relevant neighbouring stations in the network by the operation to be carried out for radio transmission of messages originating from and/or intended for the user mobile radio transmitter/receiver ERR of this mobile cellular telephony network, irrespective of the position of this mobile radio transmitter/receiver with respect to the stations of the network, as will be described further on in the description.

A more detailed description of the implementation of the various constituent steps of the intercommunication protocol forming the subject of the present invention will now be given in conjunction with FIG. 2b to 2e.

Figure 2B:
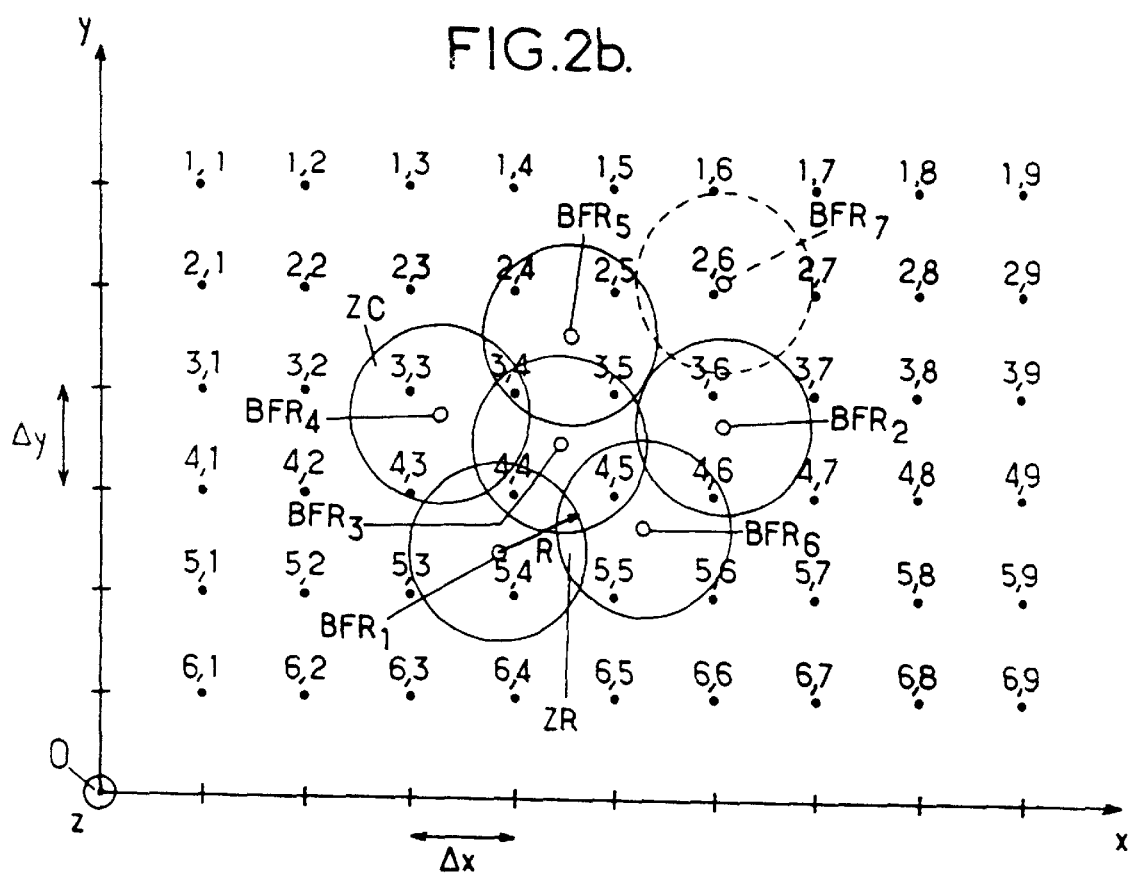

By way of illustration, FIG. 2b represents the operation consisting in assigning geographical coordinates to each fixed radio station in the network.

For a network which, by way of non-limiting example, includes six fixed radio stations denoted $BFR_1$ tp $BFR_6$ as arranged on FIG. 2b, in a two-dimensional representation, for example, a two-dimensional reference frame Oxy and a grid-type network of repeat distance $\Delta x$, $\Delta y$, and, if appropriate, $\Delta z$ is associated with this network. The aforementioned repeat values may or may not have the same dimensional value.

According to an advantageous aspect of the protocol forming the subject of the present invention, the geographical coordinates satisfy the equation:

$$k_x = E(x/\Delta x)$$

$$h_y = E(y/\Delta y)$$

$$k_z = E(z/\Delta z).$$

In this equation, further to the values $\Delta x$, $\Delta y$, $\Delta z$ of the repeat distance of the grid-type network in the corresponding directions, $k_x$, $k_y$ and $k_z$ represent a real coefficient representing the distance in the corresponding direction x, y or z of the fixed station from the origin O, and the symbol E denotes the integer part of the ratio $x/\Delta x$, $y/\Delta y$, or $z/\Delta z$.

Taking into account the rule governing the assigning of the aforementioned geographical coordinates, in the example given in FIG. 2b, the fixed radio station $BFR_1$ is assigned the geographical coordinate 5, 4 of the grid-type network constituting the reference frame which is used. Each fixed radio station in the network can then advantageously be located by means of the geographical coordinates thus assigned, by means of the coefficients $k_x$, $k_y$, $k_z$.

As regards the sub-step 1001a in FIG. 2a, consisting in determination of the neighbouring stations, it may be indicated that the neighbouring stations thus represented, for example, in FIG. 2b are determined by the existence of an overlap zone ZR between the coverage zone ZC of two stations in the network.

Thus, for fixed radio stations having a substantially circular coverage zone, as represented in FIG. 2b, the overlap zone between two neighbouring cells corresponds to the intersection of the coverage zones of each of them.

It may, of course, be pointed out that the radius R of each coverage zone is determined, on the one hand, by the type of cellular radiotelephony network in question and by the configuration of the terrain on which the network is set up, for example.

For the case of a DECT mobile radiotelephony network, the fixed radio stations have an outdoor range, that is to say a radius R, in the order of 150 meters. In such a case, the grid size of the station location network may be chosen as equal to a value of the order of the theoretical range of each fixed radio station, i.e. $\Delta x = \Delta y = 150$ meters.

The determination of the neighbouring stations in step 1001a is then carried out on the simple criterion of whether or not the aforementioned coverage zones intersect.

The correlation of the coordinates of the neighbouring stations in step 1001b can then be carried out using a criterion involving the physical distance between the centres of the coverage zones of each fixed radio station, two fixed radio stations being considered as neighbours when the distance between the centres of their coverage zones is less than 2R. Of course, the aforementioned operation then makes it possible to form a list of the neighbouring stations. In particular, in the example in FIG. 2b, the set of neighbouring stations is given by:

$BFR_1$, $BFR_3$; $BFR_1$, $BFR_4$; $BFR_1$, $BFR_6$;

$BFR_3$, $BFR_4$; $BFR_3$, $BFR_5$; $BFR_3$, $BFR_2$; $BFR_3$, $BFR_6$;

$BFR_4$, $BFR_5$;

$BFR_5$, $BFR_2$;

$BFR_2$, $BFR_6$.

The correlation of the coordinates of the neighbouring stations in sub-step 1001b is then carried out on the basis of the pairs of neighbouring stations and their aforementioned addresses or physical coordinates, and the virtual-ring interconnection of the various neighbouring stations is carried out differently depending on the nature of the physical interconnection of the fixed radio stations constituting the network to the connection unit URB.

Figure 2C:
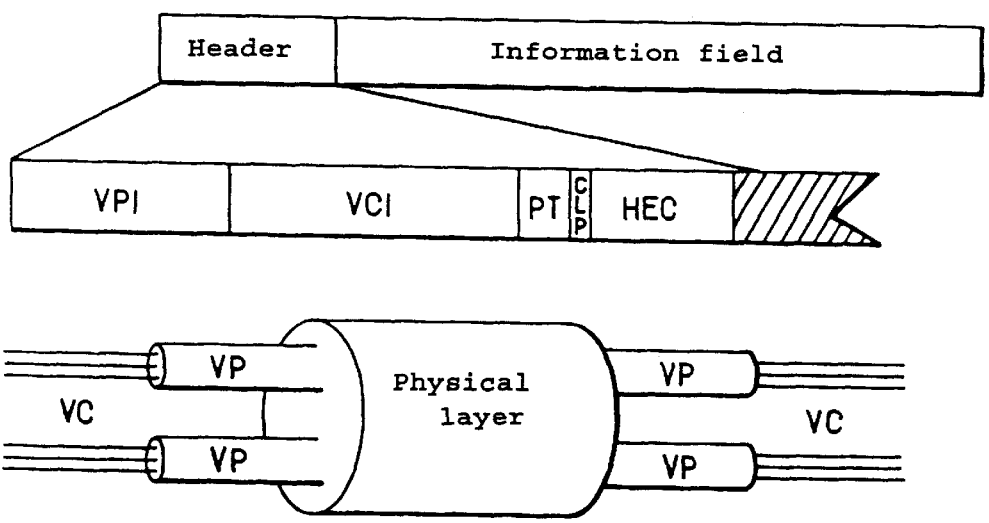
Figure 2D:
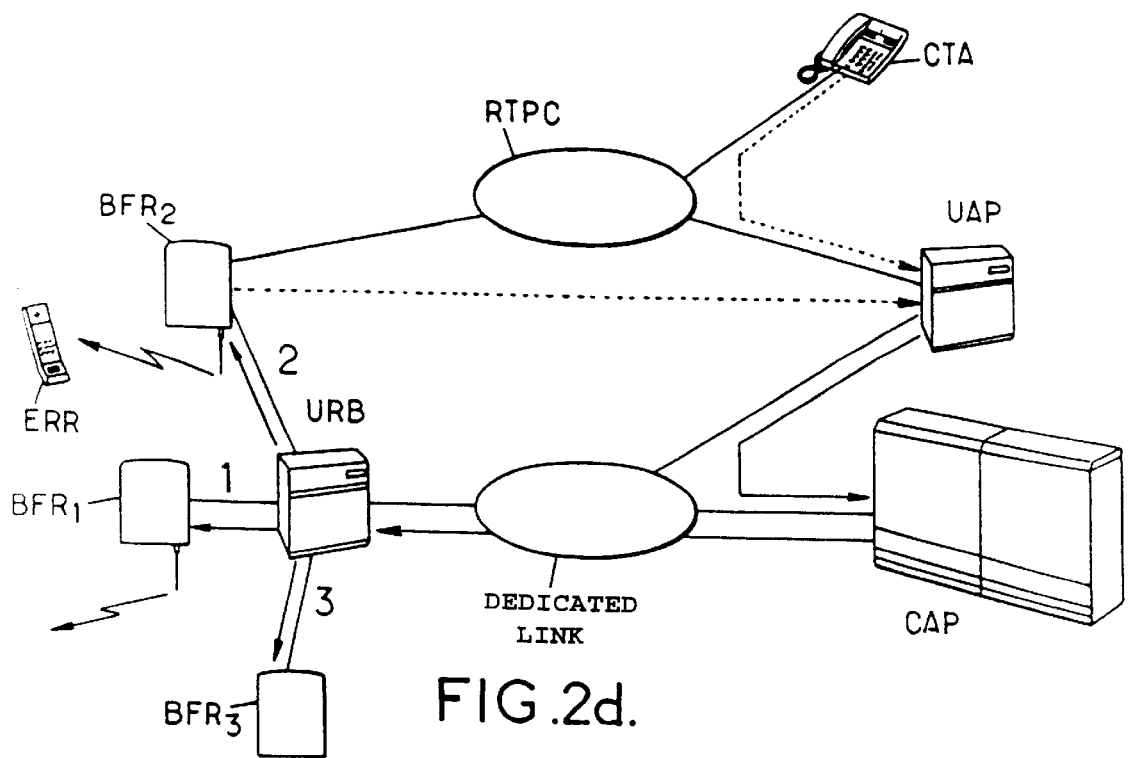

In the case where, as represented in FIG. 2d, interconnection to the connection unit URB is carried out in a tree form, the virtual-ring interconnection of the various fixed radio stations and, in particular, of two successive fixed radio stations, consists in the following: on the basis of a list of the geographical coordinates of the neighbouring stations, that is to say of the pairs of geographical coordinates of the neighbouring fixed stations determined beforehand, stored, for example, in the connection unit URB, transmitting the management messages sequentially to the fixed radio station $BFR_1$ then to the fixed radio station $BFR_2$ then to the fixed radio station $BFR_3$, it being assumed that the fixed radio stations $BFR_1$ and $BFR_2$ are neighbours and that the fixed radio stations $BFR_2$ and $BFR_3$ are also neighbours. In this case, it is clear to see that the virtual-ring interconnection makes it possible to transmit all the management messages to all the network stations neighbouring the two successive fixed radio stations.

Figure 2E:
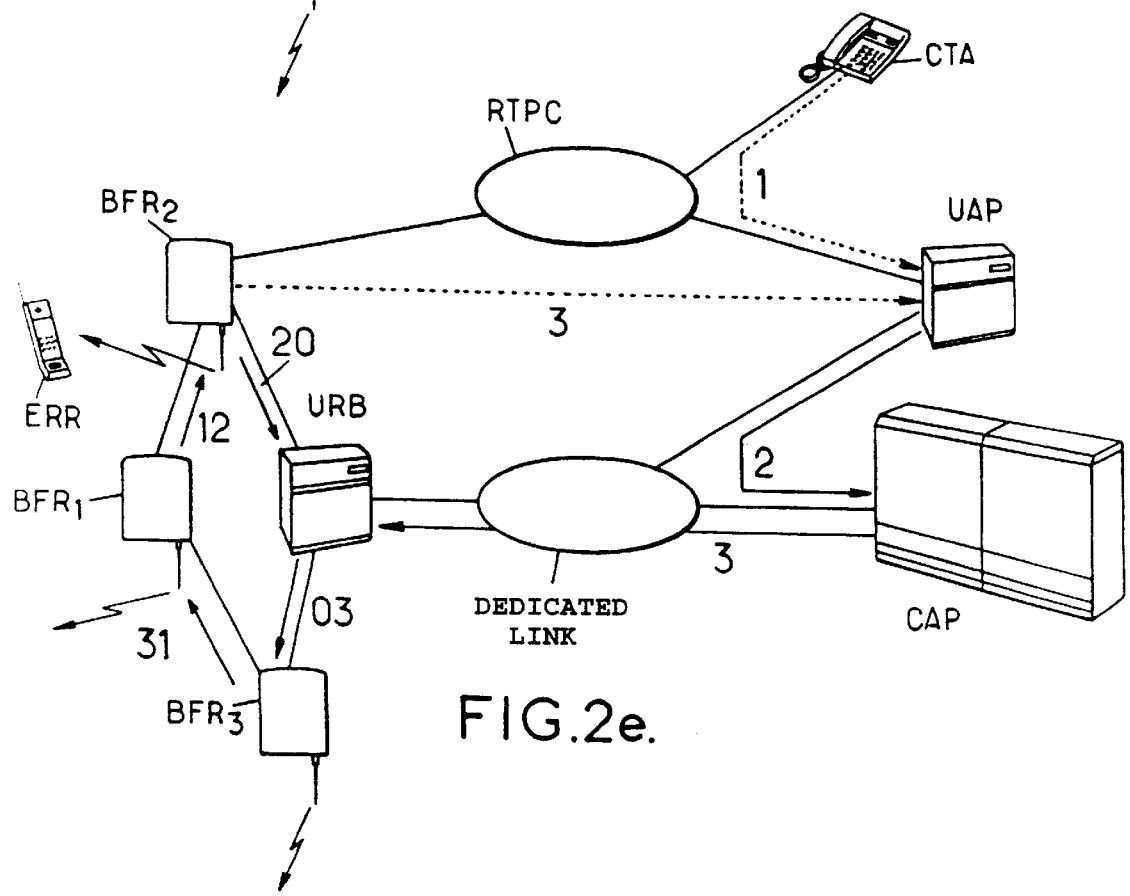

Conversely, in the case in FIG. 2e, in which the fixed radio stations are physically connected to the connection unit URB by means of a physical ring, that is to say by a transmission line which actually interconnects the fixed radio stations and the connection unit in a closed circuit, for neighbouring fixed radio stations such as BFR, $BFR_2$; $BFR_2$, $BFR_3$; $BFR_3$, $BFR_1$, the virtual-ring interconnection of two successive neighbouring stations consists, on the basis of the list of the corresponding geographical coordinates which were established, for example, and stored in the connection unit URB, in transmitting to each fixed radio station the geographical coordinates of its neighbouring fixed radio stations.

In such a case, the management messages originating from the connection unit URB can then be transmitted, for example, in the transmission direction chosen by the connection unit URB to the fixed radio station $BFR_3$, according to a transaction denoted by 0-3 in FIG. 2e, then from the fixed radio station $BFR_3$ to the fixed radio station $BFR_1$ according to the transaction 3-1, from the fixed radio station $BFR_1$ to the fixed radio station $BFR_2$ according to the transaction 1-2, and finally from the fixed radio station $BFR_2$ to the connection unit URB according to the transaction 2-0.

It can also be seen that owing to the virtual-ring connection, all the fixed radio stations constituting the network then receive each management message by successive transmission from one neighbouring station to the next.

In general, it may be pointed out that the virtual-ring interconnection of the neighbouring stations consists, at each fixed radio station, in establishing a set of circuit identifiers for the neighbouring stations, these identifiers being denoted VCI.

A more detailed description of the formation of the neighbouring-station circuit identifiers will now be given in conjunction with FIG. 2c, in the particular non-limiting case, given by way of example, of an asynchronous ATM mode link between successive neighbouring stations. It will, however, be recalled that the principle is the same in DQDB mode.

As represented in FIG. 2c, it will be recalled that an information cell transmitted in ATM mode includes 53 octets, the first 5 octets containing the header of the information cell and the remaining 48 octets containing the information field proper.

In particular, it will be understood that in the context of implementing the protocol forming the subject of the present invention, the header makes it possible to send the management information contained in the information field to the various fixed radio stations constituting the network.

In the header field, the last octet, denoted HEC in FIG. 2c, corresponds to an error-corrector code relating to the 4 octets preceding this last octet. The first 4 octets therefore include 32 bits, successively containing:

- an identification field denoted VPI coded over 12 bits, this field corresponding to a Virtual Path Identifier and in fact making it possible to switch the management messages to the appropriate connection unit URB. The identification field VPI can actually be used in the sub-network formed by the URB and the fixed radio stations;
- this virtual path identifier field is followed by a virtual circuit or channel field, VCI as before, constituting the circuit identifier for the neighbouring stations in accordance with the protocol forming the subject of the present invention. This circuit field VCI, VCI standing for Virtual Channel Identifier, makes it possible, within a given path, to identify the messages intended for the various fixed radio stations. The VCI field is coded over 16 bits;
- a PT field coded over 3 bits is furthermore provided, and makes it possible to code the type of content of the message, that is to say the information contained in the information field. The aforementioned PT field makes it possible to identify information relating to the network or, if appropriate, the radio transmitter/receiver ERR in question;
- finally, a last field coded over 1 bit, denoted CLP, makes it possible to use the information contained in the information field to assign an order of priority or an order of importance for qualifying the information which is carried. When the CLP field has the value 1, the cell can be destroyed if appropriate, whereas when the CLP field has the value 0, the information carried in the information field needs to be kept as a priority.

According to a particularly advantageous aspect of the protocol forming the subject of the present invention, it may be indicated that the circuit identifiers for the neighbouring stations, consisting of the VCI field in the aforementioned example, then correspond to the geographical coordinates of each neighbouring fixed radio station as defined above.

It may then be indicated that for fixed radio stations which have a proximity zone, that is to say an intersection of the overlap zones determined in transmission/reception, each circuit identifier VCI for the neighbouring stations is formed by two values which are a function of the geographical coordinates and of the size chosen for the proximity zone of the fixed radio stations.

It will be understood that the aforementioned function depends both on the repeat distance of the network and on the actual range of each fixed radio station, that is to say on the distance R or radius of the coverage zone.

Thus, the virtual-ring interconnection in the example which is given, relating to asynchronous ATM mode transmission, then makes it possible, for each connection station URB to assign a determined VPI field for the connection station URB in question, as well as VCI fields containing information relating to the geographical coordinates of each neighbouring station.

Thus, in the case of an existing cellular telephony network, when modifying this network, such as the network represented in FIG. 2b, for example, by introducing a new fixed radio station, the station $BFR_7$ represented in dashes in this same FIG. 2b, the protocol forming the subject of the present invention then allows particularly simple and efficient re-updating of the configuration of this network, insofar as announcement of the neighbouring stations for updating this network is substantially eliminated. For any new fixed radio station which is installed, such as the station $BFR_7$, any management message which it emits is identified by the geographical coordinates of this station, here the coordinates 3, 6, which constitute the VCI field. Any station whose list of VCI fields of possible neighbouring stations comprises the corresponding VCI field of coordinates 3, 6 will then treat the management messages as originating from a neighbouring station. Of course, any fixed radio station, in particular any new fixed radio station which is installed, determines and establishes a list of geographical coordinates of the possible neighbouring fixed radio stations, on the basis just of the adjacent geographical coordinates, the adjacency of these coordinates being arbitrarily definable.

A more detailed description of the implementation of the intercommunication protocol forming the subject of the present invention, in the case of managing the hand-over when a mobile radio transmitter/receiver ERR passes from a current fixed radio station, station 2 in FIG. 3a, to a future fixed radio station, station 1 in the same figure, as the mobile in question moves around will now be given.

During a transition of this type, it is clearly necessary, according to the customary procedure in cellular telephony networks, for the context of the application in question to be transferred automatically.

In order to ensure this transmission, and according to the protocol forming the subject of the present invention, the management messages may, as represented in FIG. 3a, comprise an automatic transfer request message, the message $M_{12}$ transmitted from the future fixed radio station $BFR_1$ to the current fixed radio station $BFR_2$. This request message $M_{12}$ comprises at least a header field for identifying the type of message, denoted by TYP, an address field for the current fixed radio station $VCI_2$ relating to the fixed radio station $BFR_2$, and a handover transfer request field, denoted REQ HO, in particular including the identification of the fixed radio station $BFR_1$, the future fixed radio station.

In response to this request message, a hand-over transfer response message, the message $M_{21}$, is sent from the current fixed radio station $BFR_2$ to the future fixed radio station $BFR_1$. This hand-over transfer response message comprises at least:

a header field for identifying the type of message, also denoted as TYP, an address field $VCI_1$ for the future fixed radio station $BFR_1$, and finally an information field relating to the call context transferred to this future fixed radio station.

When the future fixed radio station $BFR_1$ has a plurality of other neighbouring fixed radio stations, with only the fixed radio station $BFR_2$ being active with respect to the radio transmitter/receiver ERR, it is only this active current fixed radio station $BFR_2$ which responds to the request message $M_{12}$ transmitted by the future fixed radio station $BFR_1$ to all these neighbouring stations.

The protocol forming the subject of the present invention can also be employed particularly advantageously in the case of managing incoming calls on the cellular telephony network, originating from a subscriber telephone set CTA of the switched telephone network to a mobile radio transmitter/receiver ERR, as will now be described in conjunction with FIG. 3b.

In such a case, and in order to manage any aforementioned incoming call, the management messages may include at least one incoming call message transmitted from the connection unit to the neighbouring stations. This incoming call message includes at least one header field for message identification, denoted TYP in FIG. 3b, and a field for identifying the intended neighbouring station, the aforementioned VCI field.

This first message is transmitted by the connection unit URB to, for example, the first station $BFR_1$ in FIG. 3b, by a transaction $M_{01}$. The incoming call message also includes a field of information relating to the call number of the mobile radio transmitter/receiver ERR. On reception of this message by the fixed radio station $BFR_1$, the process is then as follows:

The fixed radio station $BFR_1$ calls the mobile radio transmitter/receiver ERR on the basis of the call number contained in the information field.

On response by the radio transmitter/receiver ERR, when it lies in the coverage zone of the fixed radio station $BFR_1$, the fixed radio station $BFR_1$ transmits a response code message intended for the connection unit, in a transaction $M_{10}$.

This response code message, as represented in FIG. 3b, includes at least a header field TYP for identifying the message type, a field VCI for identifying the connection unit, and finally a response code information field making it possible to ensure that the incoming call from the subscriber telephone set is joined with the mobile radio transmitter/receiver ERR.

In the absence of response from the mobile radio transmitter/receiver ERR, the fixed radio station $BFR_1$ transmits an incoming call message on the virtual ring to the neighbouring station $BFR_2$. The call process is repeated by the station $BFR_2$ and, if there is no response from the mobile radio transmitter/receiver, station $BFR_2$ transmits an incoming call message $M_{23}$ to station $BFR_3$ in order to repeat the aforementioned process.

On response from the mobile radio transmitter/receiver ERR, after the fixed radio station $BFR_3$ calls this mobile radio transmitter/receiver, the aforementioned fixed radio station sends a response code message to the connection unit URB in a transaction $M_{30}$.

Finally, the protocol forming the subject of the present invention can be employed in the context of automatic dynamic management of radio transmission resources of the fixed radio stations.

In such a case, as represented in FIG. 3c, when, for example in similar fashion to the case in FIG. 3a, a mobile radio transmitter/receiver has given rise to a hand-over management procedure between a current station $BFR_4$ and a future station $BFR_2$, the future station then implements an automatic management process for the aforementioned radio resources. For the future fixed radio station $BFR_2$, this automatic management consists in suitably assigning the frequency space and/or time interval allocated to each fixed radio station of the mobile cellular telephony network.

It will be understood, in particular, that for a set of frequencies assigned to a mobile cellular telephony network, and of successive time intervals constituting frames in which the information cells are transmitted, the future fixed radio station $BFR_2$ transmits to all its neighbouring fixed radio stations a management message which is referred to as an automatic assignment message and, as represented in FIG. 3c, includes at least:

a header field for identifying the type of message, this field being, by convention, referenced TYP, an identification field for the neighbouring station which is the destination of this message, this field being denoted VCI in FIG. 3c and corresponding to the address of the fixed radio stations $BFR_1$, $BFR_3$ and $BFR_4$, and a resource reference field, indicating the frequency and/or the time interval for transmission which is used by the future fixed radio station, the fixed radio station $BFR_2$ in the example in FIG. 3c.

At each neighbouring station, $BFR_1$, $BFR_3$, $BFR_4$, this information then makes it possible to prevent the same resources, that is to say the same frequency as the one used by the future fixed radio station $BFR_2$ and/or the corresponding time interval, from being used for the transaction with the radio transmitter/receiver ERR in question and in the application in question.

A description has thus been given of a protocol for interconnection between fixed radio stations of a cellular telephony network which makes it possible to transmit management messages for this network between these stations, this protocol being particularly efficient insofar as introducing the geographical coordinates of each station makes it possible to simplify and optimize the procedures such as the hand-over management, the incoming call management or the automatic assignment of radiotelephony resources for any set of neighbouring stations in question.

Furthermore, as regards the identification of the stations using a grid-type network, it may be indicated that the repeat distance of the network can be defined as a function of the topology of the mobile radiotelephony network and, in particular, of the topology governing the set-up of the fixed radio stations.

Finally, it may be pointed out that the fineness of the spatial grid of the grid-type location network also makes it possible to vary the message processing load at each neighbouring fixed radio station, this processing load being associated with the communications between aforementioned neighbouring stations.

What is claimed is:

1. A protocol for intercommunications between fixed radio stations of a cellular telephony network for the transmission of network-management messages between said fixed radio stations, said protocol comprising:

a) assigning geographical coordinates to each fixed radio station belonging to said cellular telephony network;

b) forming a virtual-ring interconnection for any set of two successive fixed radio stations constituting neighbouring stations, said neighbouring stations being identified on the basis of said geographical coordinates on said virtual ring; and c) transmitting said management messages between neighbouring stations, in a self-adaptive manner such that updates regarding the network are automatically recognized and communications are managed based on said updates.

2. The protocol of claim 1, wherein said virtual-ring interconnection comprises establishing, at each fixed radio station, a set of circuit identifiers (VCI) for the neighbouring stations.

3. The protocol of claim 2, wherein, for fixed radio stations having a proximity zone of determined size in transmission/reception of value P, each circuit identifier for the neighbouring stations is formed by two values which are a function of said geographical coordinates and of said determined size chosen for the proximity zone of the fixed radio stations.

4. The protocol according to claim 1, wherein said geographical coordinates assigned to each fixed radio station are established in a two-dimensional or three-dimensional reference frame established on the basis of a grid-type network of repeat distance $\Delta x$, $\Delta y$, $\Delta z$, each coordinate satisfying the equation $$k_x = E(x/\Delta x)$$

$$k_y = E(y/\Delta y)$$

$$k_z = E(z/\Delta z)$$

in which equation $\Delta x$, $\Delta y$, $\Delta z$ represents the value of the repeat distance of the grid-type network in the corresponding direction x, y or z;

$k_x$, $k_y$, $k_z$ represents a real coefficient representing the distance in the corresponding direction x, y, z of the fixed radio station from the origin and;

E denotes the integer part of the ratio $x/\Delta x$, $y/\Delta y$, or $z/\Delta z$.

5. The protocol of claim 1 wherein, in a case of hand-over management when a mobile radio transmitter/receiver passes through the overlap zone of two neighbouring fixed radio stations formed by a current and a future fixed radio station, said management messages comprise:

an automatic transfer request message transmitted from said future fixed radio station to said current fixed radio station, said automatic transfer request message comprising at least:
 a header field for identifying the type of message,
 an address field for said current fixed radio station,
 a hand-over transfer request field, and in response to this automatic transfer request message:

a hand-over transfer response message transmitted from said current fixed radio station to said future fixed radio station, said hand-over transfer response message comprising at least:
 a header field for identifying the type of message,
 an address field for said future fixed radio station,
 an information field relating to the call context.

6. The protocol of claim 1, wherein, in a case of managing incoming calls on the cellular telephony network which are generated by a subscriber telephone set of a switched telephone network to a mobile radio transmitter/receiver, said management messages include at least:

an incoming call message transmitted from the connection unit to the neighbouring stations, said incoming call message including at least:
 a header field for identifying the message,
 an identification field for the destination neighbouring station,
 a call number field for the mobile radio transmitter/receiver, and on response to said incoming call message by one of the neighbouring stations, a response code message intended for the connection unit, said response code message including at least:
 a header field for identifying the type of message,
 an identification field for the connection unit, allowing to ensure that the incoming call from the subscriber telephone set is joined with the mobile radio transmitter/receiver.

7. The protocol according to claim 1, wherein, in the case of automatic dynamic resource management, said management messages transmitted from a fixed radio station to a neighbouring fixed radio station include at least:

a header field for identifying the type of message, an identification field for the neighbouring station which is the destination of this message, a resource reference field indicating the frequency and/or the time interval for transmission used by said fixed radio station.

8. The protocol of claim 1, wherein the determination of any neighbouring fixed radio station is carried out on the basis of a list of the geographical coordinates of the possible neighbouring fixed radio stations.

9. A protocol for intercommunications between fixed radio stations of a cellular telephony network for the transmission of network-management messages between said fixed radio stations, said protocol comprising:

a) assigning geographical coordinates to each fixed radio station belonging to said cellular telephony network, wherein said geographical coordinates are established in a two-dimensional or three-dimensional grid-type network of repeat distance $\Delta x$, $\Delta y$, $\Delta z$, each coordinate satisfying the equation $$k_x = E(x/\Delta x)$$

$$k_y = E(y/\Delta y)$$

$$k_z = E(z/\Delta z)$$

in which equation
 $\Delta x$, $\Delta y$, $\Delta z$ represents the value of the repeat distance of the grid-type network in the corresponding direction x, y, or z;
 $k_x$, $k_y$, $k_z$, represents a real coefficient representing the distance in the corresponding direction x, y, z of the fixed radio station from the origin;
 and E denotes the integer part of the ratio $x/\Delta x$, $y/\Delta y$, $z/\Delta z$;

b) forming a virtual-ring interconnection for any set of two successive fixed radio stations constituting neighbouring stations, said neighbouring stations being identified on the basis of said geographical coordinates on said virtual ring; and c) transmitting said management messages between neighbouring stations, thereby enabling transmission of said messages by self-adaptive intercommunication between the fixed radio stations of said network.

* * * * *